US012257848B2

(12) United States Patent
Chen et al.

(10) Patent No.: US 12,257,848 B2
(45) Date of Patent: Mar. 25, 2025

(54) CONSUMABLE PACKAGE ASSEMBLY

(71) Applicant: Zhuhai Ninestar Management Co., Ltd., Guangdong (CN)

(72) Inventors: Weijian Chen, Guangdong (CN); Huafeng Zhang, Guangdong (CN)

(73) Assignee: ZHUHAI NINESTAR MANAGEMENT CO., LTD., Guangdong (CN)

( * ) Notice: Subject to any disclaimer, the term of this patent is extended or adjusted under 35 U.S.C. 154(b) by 229 days.

(21) Appl. No.: 17/998,151

(22) PCT Filed: Apr. 30, 2021

(86) PCT No.: PCT/CN2021/091609
§ 371 (c)(1),
(2) Date: Nov. 7, 2022

(87) PCT Pub. No.: WO2021/223685
PCT Pub. Date: Nov. 11, 2021

(65) Prior Publication Data
US 2023/0234367 A1 Jul. 27, 2023

(30) Foreign Application Priority Data
May 8, 2020 (CN) ......................... 202020737137.6
Jul. 23, 2020 (CN) ......................... 202021476167.2

(51) Int. Cl.
*B41J 2/175* (2006.01)
*B65D 5/42* (2006.01)
*B65D 5/50* (2006.01)

(52) U.S. Cl.
CPC ......... *B41J 2/17553* (2013.01); *B41J 2/1752* (2013.01); *B41J 2/17533* (2013.01);
(Continued)

(58) Field of Classification Search
CPC .. B41J 2/17553; B41J 2/1752; B41J 2/17533; B41J 2/1755; B65D 5/4204; B65D 5/505
See application file for complete search history.

(56) References Cited

U.S. PATENT DOCUMENTS 6,059,402 A * 5/2000 Martens ............... B41J 2/17553 347/86
2001/0032799 A1 10/2001 Shinada
(Continued)

FOREIGN PATENT DOCUMENTS

CN 201086453 Y 7/2008
CN 207361007 U 5/2018
(Continued)

OTHER PUBLICATIONS

ISA China National Intellectual Property Administration, International Search Report Issued in Application No. PCT/CN2021/091609, Aug. 2, 2021, WIPO, 8 pages. (Submitted with Partial Translation).
(Continued)

*Primary Examiner* — Justin Seo
*Assistant Examiner* — Tracey M McMillion
(74) *Attorney, Agent, or Firm* — McCoy Russell LLP

(57) ABSTRACT

Provided is a consumable package assembly including a consumable container and an outer packaging portion. The consumable container includes a chip, and the outer packaging portion includes an accommodating portion for accommodating the consumable container. The outer packaging portion includes a first through hole configured to expose at least a part of the chip, and a second through hole configured to expose at least apart of the accommodating portion so as to position the consumable container. Operation to the chip on the consumable container can be performed without removing the outer packaging portion so as to avoid scrapping of the outer packaging portion, thereby
(Continued)

reducing the procedures of the production or the reprocessing and resulting in lower cost and higher efficiency. The second through hole is configured to prevent the unfixed position of the consumable container in the outer packaging portion from resulting inaccurate operation to the chip.

18 Claims, 9 Drawing Sheets

(52) U.S. Cl.
CPC .......... *B41J 2/1755* (2013.01); *B65D 5/4204* (2013.01); *B65D 5/505* (2013.01)

(56) References Cited

U.S. PATENT DOCUMENTS

| | | | | |
|---|---|---|---|---|
| 2008/0226341 | A1 * | 9/2008 | Mase | G03G 21/1889 399/119 |
| 2009/0015644 | A1 * | 1/2009 | Shinada | B41J 2/17506 347/92 |
| 2011/0303687 | A1 | 12/2011 | Amemiya | |
| 2015/0217904 | A1 | 8/2015 | Burnett | |
| 2019/0039381 | A1 | 2/2019 | Ishizawa et al. | |

FOREIGN PATENT DOCUMENTS

| | | | |
|---|---|---|---|
| CN | 208037106 | U | 11/2018 |
| CN | 208199314 | U | 12/2018 |
| CN | 109605941 | A | 4/2019 |
| CN | 209794884 | U | 12/2019 |
| CN | 212862328 | U | 4/2021 |
| DE | 102007037912 | A1 | 4/2008 |
| EP | 1541357 | A1 | 6/2005 |
| JP | 2000255082 | A | 9/2000 |
| JP | 2003320685 | A | 11/2003 |
| JP | 2004123099 | A | 4/2004 |
| JP | 2004231248 | A | 8/2004 |
| JP | 2006159512 | A | 6/2006 |
| JP | 2008044190 | A | 2/2008 |
| JP | 2008105683 | A | 5/2008 |
| JP | 2010000804 | A | 1/2010 |
| JP | 2018062175 | A | 4/2018 |

OTHER PUBLICATIONS

European Patent Office, Extended European Search Report Issued in Application No. 21789599.4, May 8, 2023, Germany, 7 pages.

Japanese Patent Office, Office Action Issued in Application No. 2022-567618, Jul. 4, 2023, 17 pages. (Submitted with Machine Translation).

* cited by examiner

CONSUMABLE PACKAGE ASSEMBLY

CROSS REFERENCE TO RELATED APPLICATIONS

The present application is a U.S. National Phase of International Application No. PCT/CN2021/091609, entitled "PACKAGING ASSEMBLY FOR CONSUMABLE", and filed on Apr. 30, 2021. U.S. National Phase of International Application No. PCT/CN2021/091609 claims priority to Chinese Patent Application No. 202020737137.6, filed on May 8, 2020, and to Chinese Patent Application No. 202021476167.2, filed on Jul. 23, 2020 The entire contents of the above-listed applications are hereby incorporated by reference for all purposes.

TECHNICAL FIELD

The present disclosure relates to the field of printing technologies and, in particular, to a consumable package assembly.

BACKGROUND

A printer is an indispensable equipment for production and life. A consumable container is a consumable part of a printer. When the consumable container is used up, it needs to be replaced with a new consumable container. In the market, consumable containers are sold together with outer packaging portions, which are called consumable package assemblies. A chip is a device that stores information on the consumable container and transmits data with the printer. In certain cases, if the electronic system of the printer needs to be upgraded, consumables need to be overhauled, and verification information stored on the chip (the serial number information stored on the chip) needs to be replaced, etc., when the information stored in the chip needs to be reset, rewritten, or detected, enterprises manufacturing consumables need to remove the outer packaging portion of the packaged consumable package assemblies, take out the consumable container, and then operate the chip of the consumable container. After completing operation, the consumable container needs to be assembled with a new outer packaging portion to form a new consumable package assembly.

This technical solution will cause the scrapping of the outer packaging portion and the increment of the procedures, resulting in increased costs and low production efficiency.

SUMMARY

The present disclosure provides a consumable package assembly, aiming at improving the usage rate of outer packaging portion.

Embodiments of the present disclosure provide a consumable package assembly a consumable container and an outer packaging portion, wherein the consumable container includes a chip, and the outer packaging portion includes an accommodating portion for accommodating the consumable container.

The outer packaging portion includes a first through hole configured to expose at least a part of the chip, and a second through hole configured to expose at least part of the accommodating portion, so as to position the consumable container.

In an embodiment, the second through hole is configured such that at least a part of the chip device for operating the chip is capable of being inserted into the accommodating portion to position the consumable container.

In an embodiment, the outer packaging portion includes a first surface and a second surface opposite to the first surface along a width direction of the consumable package assembly. The chip is provided corresponding to the first surface and is parallel to the first surface, and the chip is arranged closer to the first surface than to the second surface, and the first through hole is provided in the first surface.

In an embodiment, at least one of the first surface and the second surface is provided with the second through hole along the width direction of the consumable package assembly.

In an embodiment, the outer packaging portion further includes a third surface and a fourth surface opposite to the third surface along a length direction of the consumable package assembly. At least one of the third surface and the fourth surface is provided with the second through hole.

In an embodiment, the outer packaging portion further includes a third surface and a fourth surface opposite to the third surface along a length direction of the consumable package assembly. At least one of the first surface and the second surface is provided with the second through hole, and at least one of the third surface and the fourth surface is provided with the second through hole.

In an embodiment, the outer packaging portion includes a plurality of second through holes.

In an embodiment, the consumable package assembly further includes a holding member provided at the accommodating portion and configured to load the consumable container.

In an embodiment, the second through hole exposes a part of the holding member to position an assembly of the consumable container and the holding member.

In an embodiment, the holding member includes a positioning hole aligned with the second through hole in a width direction or a length direction.

In an embodiment, the consumable package assembly further includes a protection component covering at least a part of the first through hole and configured to block communication between the accommodating portion and the outside. The protection component is capable of shielding or opening the first through hole.

In an embodiment, the protection component includes an upper cover and a lower cover, the upper cover is rotatably connected to the lower cover, the lower cover is connected to the outer packaging portion and covers the first through hole. The lower cover includes a third through hole in communication with the first through hole. The upper cover is connected to the outer packaging portion and is capable of moving relative to the outer packaging portion. During movement of the upper cover, the upper cover is capable of shielding or opening the first through hole.

In an embodiment, one of the upper cover and the lower cover is provided with a first clamping portion and the other one of the upper cover and the lower cover is provided with a first engagement portion. The first clamping portion is capable of being clamped to or unlocked from the first engagement portion. When the first clamping portion is clamped to the first engagement portion, the upper cover blocks the third through hole.

In embodiments of the present disclosure, the outer packaging portion includes a first through hole configured to expose at least a part of the chip, and a second through hole configured to expose at least a part of the accommodating portion, so as to position the consumable container. Operation to the chip on the consumable container can be performed without removing the outer packaging portion so as to avoid scrapping of the outer packaging portion, thereby reducing the procedures of the production or the reprocessing and resulting in lower cost and higher efficiency. The second through hole is configured such that at least a part of the chip device for operating the chip is capable of being inserted into the accommodating portion to position the consumable container, thereby preventing the unfixed position of the consumable container in the outer packaging portion from resulting inaccurate operation to the chip.

It should be understood that the above general descriptions and the following detailed descriptions are only exemplary and do not limit the present disclosure.

The drawings herein are incorporated into the description and form a part of the description, showing embodiments consistent with the present disclosure, and are used together with the description for illustrating the principles of the present disclosure.

DESCRIPTION OF EMBODIMENTS

In order to better understand the technical scheme of the present disclosure, embodiments of the present disclosure are described in detail below in combination with the accompanying drawings.

It should be explicit that the described embodiments are only partial embodiments of the present disclosure, not all of the embodiments. Based on the embodiments in the present disclosure, all other embodiments obtained by those skilled in the art without creative work belong to the protection scope of the present disclosure.

The terms used in the embodiments of the present disclosure are only for the purpose of describing specific embodiments and are not intended to limit the present disclosure. The singular forms “a”, “an”, “the” and “said” used in the embodiments of the present disclosure and the appended claims are also intended to include plural forms, unless the context clearly indicates other meanings.

It should be understood that the term “and/or” used herein is only an association relationship describing the association object, indicating that there can be three relationships, for example, A and/or B, which can represent that there are three situations: A alone, A and B at the same time, and B alone. In addition, the character “/” herein generally means that the former and latter associated objects have an “or” relationship.

It should be noted that the location words “up”, “down”, “left”, “right” and so on described in the embodiments of the present disclosure are described from the perspective shown in the attached drawings and should not be understood as limiting the embodiments of the present disclosure. In addition, in the context, it should also be understood that when it is mentioned that an element is connected “above” or “below” another element, it can be directly connected “above” or “below” another element, and can be indirectly connected “above” or “below” another element through an intermediate element.

First Embodiment

Figure 1:
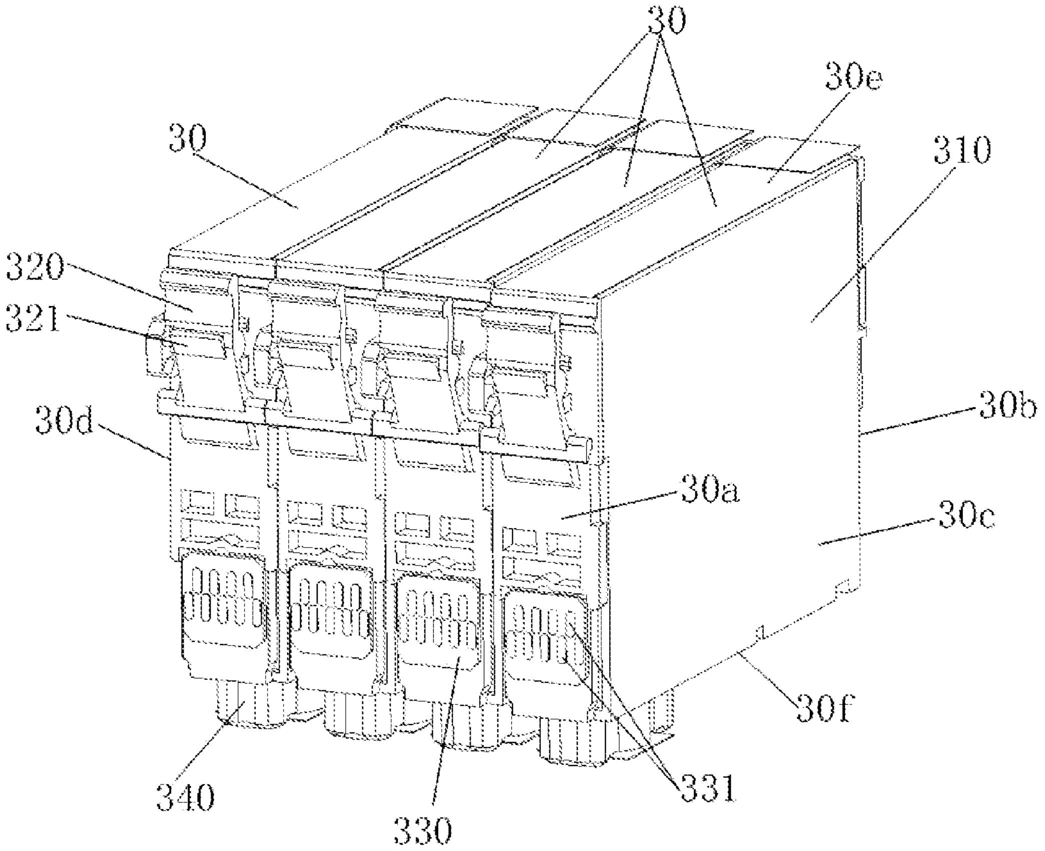
FIG. 1 is a schematic diagram of a consumable container in a first embodiment of the present disclosure.

FIG. 1 is a schematic diagram of the consumable container in a first embodiment. FIG. 1 shows a plurality of consumable containers. The plurality of consumable containers has a same structure. As is shown in FIG. 1, the consumable container 30 has a substantial cuboid shape with six surfaces, which are a bottom surface **30*f*, a top surface 30*e*, a first side surface 30*a*, a second side surface 30*b*, a third side surface 30*c*, and a fourth side surface 30*d*, respectively. The consumable container 30** can provide raw printing material for a printer after being assembled on the printer.

The consumable container 30 is provided with a main body 310, a fixing portion 320, a chip 330 and a supply port 340.

The consumable container 30 can be an ink cartridge, a toner cartridge, or an ink ribbon. Printing raw materials can be ink, toner, etc. The main body 310 stores printing raw materials, and provides the printing raw materials to the printer through the supply port 340 when necessary. The fixing portion 320 is configured to fix the consumable container 30 to the printer. The fixing portion 320 has a second clamping part 321 which matches a second engagement portion on the printer to fix the consumable container 30 to the printer. When the consumable container 30 is installed on the printer, an electrical signal is transmitted between the chip 330 and the printer. The chip 330 stores the type information of the printing raw materials, the storage amount information of the printing raw materials in the consumable container 30, the consumable model information, etc. The chip 330 has a terminal 331 abutting with the printer, so that the electrical signal can be transmitted therebetween.

As shown in FIG. 1, the supply port 340 is provided on the bottom surface **30*f* of the consumable container 30, and the chip 330 and the fixing portion 320 are provided on the first side surface 30*a*. The fixing portion 320** can be a handle that rotates around a fulcrum, a pair of snap-fit members that move in parallel, or an elastic member having elastic effect.

Figure 2:
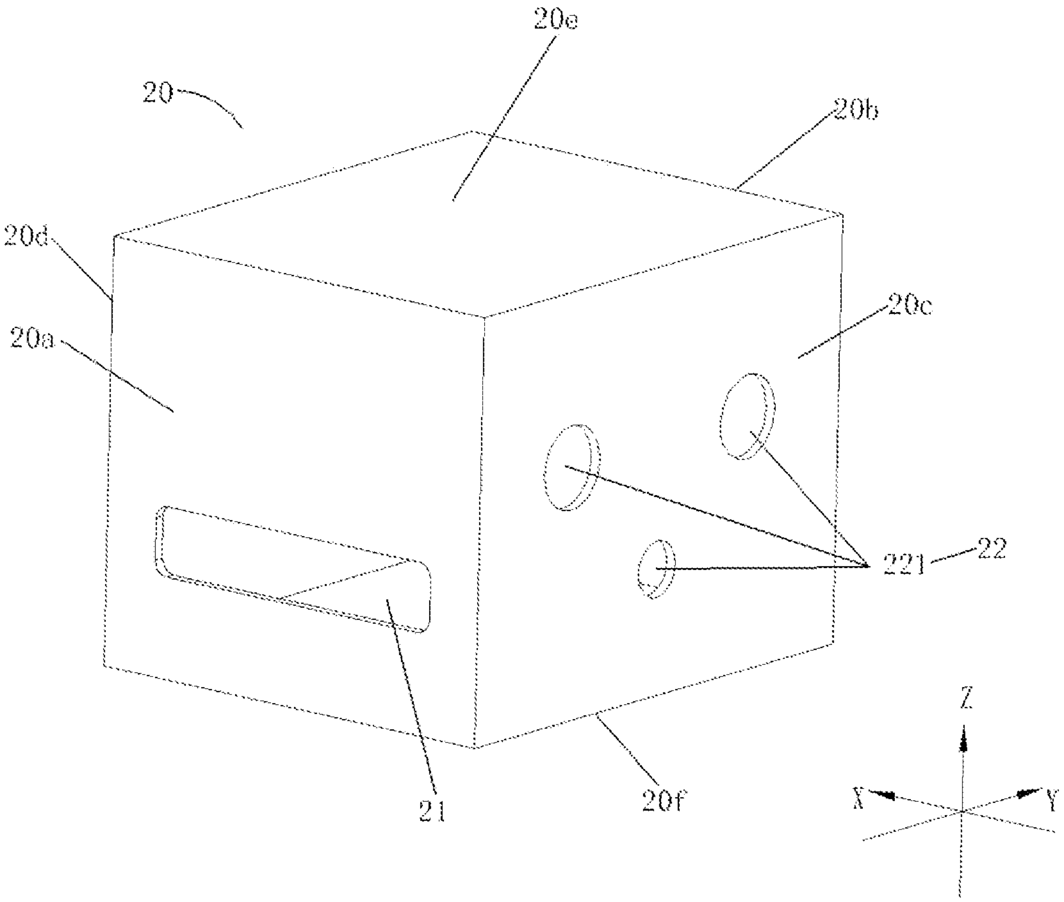
FIGS. 2 and 3 are schematic diagrams of an outer packaging portion of the first embodiment.
Figure 3:
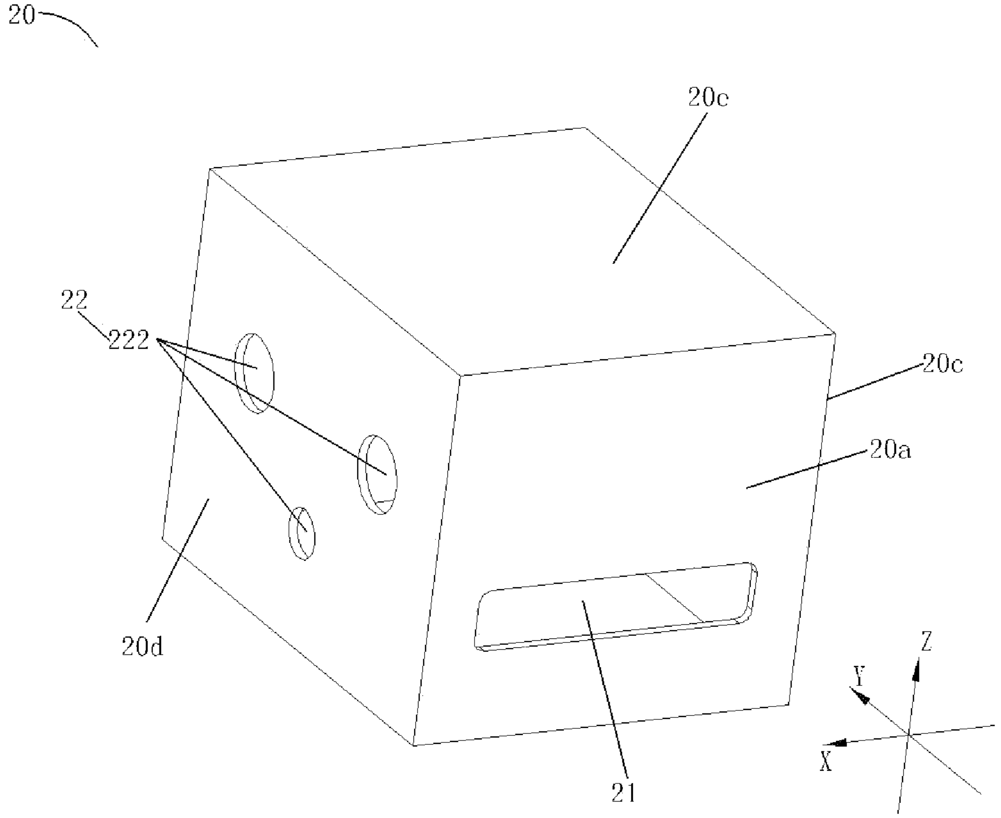

FIGS. 2 and 3 are schematic diagrams of outer packaging portions of the first embodiment. The outer packaging portion 20 has an accommodating portion in its interior, which can accommodate the consumable container 30. The outer packaging portion 20 can clamp one consumable container 30 or multiple (2, 3, 4 . . . ) consumable containers 30. The outer packaging portion 20 has a substantial cube or cuboid shape. The outer packaging portion 20 has a first surface 20*a*, a second surface 20*b*, a third surface 20*c*, a fourth surface 20*d*, a fifth surface 20*e*, and a sixth surface 20*f*. The outer packaging portion 20 has a first through hole 21 and a second through hole 22. As shown in FIGS. 2 and 3, the outer packaging portion 20 has an accommodating portion in its interior, and the accommodating portion can accommodate four consumable containers 30. The four consumable containers 30 can be consumable containers with four different colors suitable for a same printer (for example: black, red, yellow and blue), and can also be four identical products (for example: T1812C). A three-dimensional rectangular coordinate system XYZ is established. The first surface 20*a* and the second surface 20*b* are arranged opposite to each other in the Y-axis direction, and the direction in which the first surface 20*a* points to the second surface 20*b* is defined as a +Y-axis direction. The Y-axis is the width direction. The third and the fourth surfaces 20*c*, 20*d* are arranged opposite to each other in the X-axis direction, and the direction in which the third surface 20*c* points to the fourth surface 20*d* is defined as the +X-axis direction. The X-axis is the length direction. The fifth and the six surface 20*e*, 20*f* are arranged opposite to each other in the Z-axis direction, and the direction in which the fifth surface 20*e* points to the sixth surface 20*f* is defined as the +Z-axis direction. The Z-axis is the height direction. The third and the fourth surfaces 20*c*, 20*d* are intersected with the first and the second surfaces 20*a*, 20*b*. The fifth and the sixth surfaces 20*e*, 20*f* are intersected with the first, the second, the third, and the fourth surfaces 20*a*, 20*b*, 20*c*, 20*d*. The first through hole 21 are provided in the first surface 20*a*, and the second through holes 22 are provided in the third and the fourth surfaces 20*c*, 20*d*.

Furthermore, the first through hole 21 is a through hole that penetrates through the first surface 20*a* of the outer packaging portion 20. The second through holes 22 include one or more first holes 221 penetrating through the third surface 20*c*, and one or more second holes 222 penetrating through the fourth surface 20*d*. The first holes 221 and the second holes 222 are positioned opposite to each other. As shown in FIGS. 2 and 3, there are three first holes 221 and three second holes 222. The second through holes 22 can expose part of the accommodating portion to locate the consumable container 30.

Furthermore, the second through holes 22 are provided in at least one of the third and the fourth surfaces 20*c*, 20*d*. For example, the second through holes 22 are provided on the third and the fourth surfaces 20*c*, 20*d*. The first holes 221 are provided on the third surface 20*c*, and the second holes 222 are provided on the fourth surface 20*d*.

Figure 4:
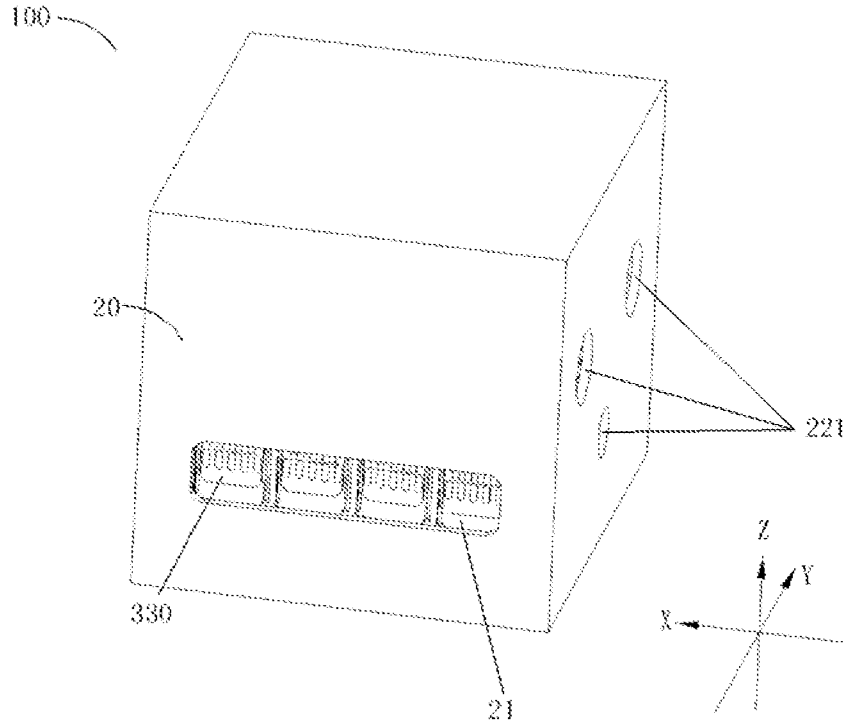
FIG. 4 is a schematic diagram of a consumable package assembly of the first embodiment.
Figure 5:
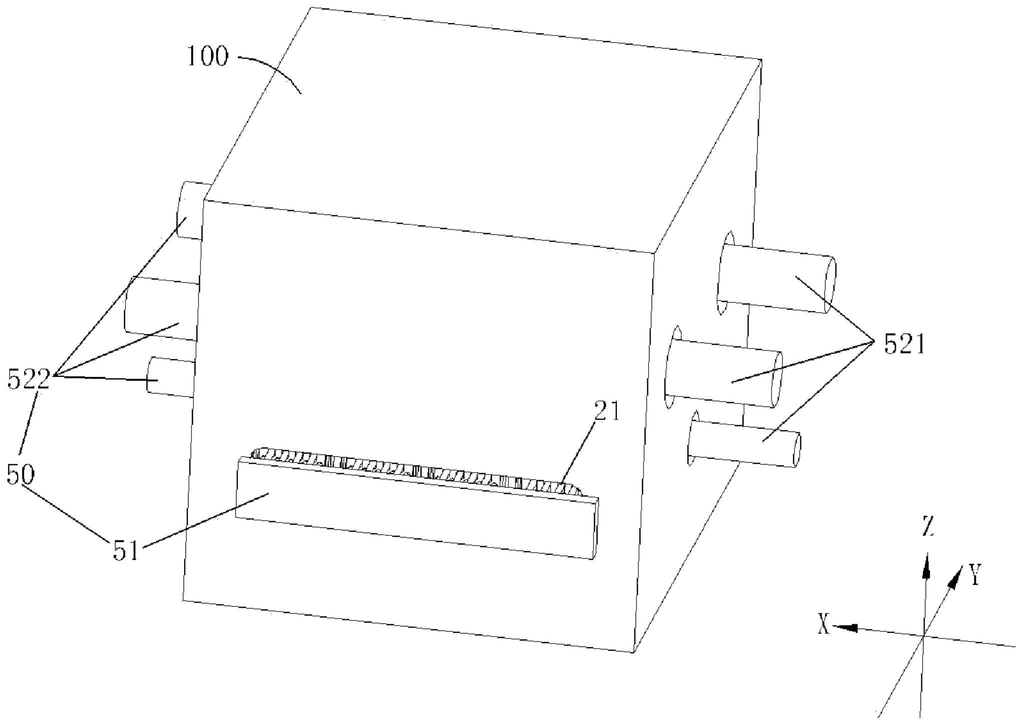
FIG. 5 is a schematic diagram of a consumable package assembly and a chip device of the first embodiment.

FIG. 4 is a schematic diagram of the consumable package assembly of the first embodiment. FIG. 5 is a schematic diagram of the consumable package assembly and the chip device of the first embodiment. The consumable package assembly 100 is matched with the chip device 50 that operates the chip 330. The consumable container 30 includes the chip 330. The outer packaging portion 20 includes the accommodating portion which accommodates the consumable container 30. The accommodating portion can accommodate one or more consumable container 30. The chip device 50 has an operation head 51 and positioning posts 52. The positioning posts 52 include first positioning posts 521 and second positioning posts 522.

The second through hole 22 is capable of inserting at least part of the chip device 50 into the accommodating portion to position the consumable container 30. As shown in FIGS. 4 and 5, in this embodiment the accommodating portion of the outer packaging portion 20 accommodates four consumable containers 30. The outer packaging portion 20 is provided with the first through hole 21 and the second through holes 22. After one or more consumable containers 30 are put in the outer packaging portion 20, the first through hole 21 exposes at least part of the chip 330 and the second through holes 22 allow at least part of the chip device 50 to be inserted into the accommodating portion to position the consumable container 30. After the consumable container 30 is put in the outer packaging portion 20, the position of the first side surface 30*a* of the consumable container 30 corresponds to the first surface 20*a* of the outer packaging portion 20 and the chip 330 corresponds to the first surface 20*a*. That is, the first side surface 30*a* of the consumable container 30 is closest to the first surface 20*a* of the outer packaging portion 20. Furthermore, the first side surface 30*a* of the consumable container 30 is parallel to and closest to the first surface 20*a* of the outer packaging portion 20. The chip 330 is parallel to the first surface 20*a* and is closer to the first surface 20*a* than to the second surface 20*b*. The position of the second side surface 30*b* of the consumable container 30 corresponds to the second surface 20*b* of the outer packaging portion 20. The position of the bottom surface 30*f* of the consumable container 30 corresponds to the sixth surface 20*f* of the outer packaging portion 20. The position of the top surface 30*e* of the consumable container 30 corresponds to fifth surface 20*e* of the outer packaging portion 20. The position of the third side surface 30*c* of the consumable container 30 corresponds to the third surface 20*c* of the outer packaging portion 20. The position of the fourth side surface 30*d* of the consumable container 30 corresponds to the fourth surface 20*d* of the outer packaging portion 20. At least part of the chip 330 on the first side surface 30*a* can be exposed from the first through hole 21 in the first surface 20*a*. Furthermore, the first through hole 21 can expose the entire of the chip 330. The operation head 51 of the chip device 50 can be electrically connected to the chip 330 via the first though hole 21 so as to operate the chip 330. Hence, operation to the chips on the consumable container 30 can be performed without removing the outer packaging portion 20 so as to reduce the scrapping of the outer packaging portion, thereby reducing the reworking procedures of the production of the outer packaging portions or the reprocessing of the outer packaging portion and resulting in lower costs and higher efficiency.

Furthermore, the form of electrical connection may be direct contact of two conductors or connection of two conductors via a third component.

However, the consumable container 30 is movable in the outer packaging portion 20. The consumable container 30 has certain movement space, resulting in that the chip device 50 cannot be electrically connected to the chip accurately during the operation and thus the chip 330 cannot be operated accurately. If the position of the consumable container 30 is offset, the contact between the operation head 51 of the chip device 50 and the chip 330 will be misplaced, resulting in that the chip device 50 cannot operate the chip 330.

The second through hole 22 can expose part of the third side surface 30*c* of one of the consumable containers 30 so that part of the chip device 50 (the positioning posts 52 of the chip device 50) extends into the accommodating portion to contact and thereby fix the consumable container 30.

As shown in FIGS. 2-5, in an embodiment, the positioning posts 52 include first positioning posts 521 and second positioning posts 522. The second through holes 22 include one or more first holes 221 penetrating through the third surface 20*c*, and one or more second holes 222 penetrating through the fourth surface 20*d*. The first holes 221 and the second holes 222 are positioned opposite to each other. The first positioning posts 521 are inserted into the accommodating portion through the first holes 221 to contact the third side surface 30*c* of the consumable container 30, and the second positioning posts 522 are inserted into the accommodating portion through the second holes 222 to contact the fourth side surface 30*d* of the consumable container 30, so as to position the consumable container 30, so that the position of the consumable container 30 relative to the chip device is uniquely fixed. Then the operation head 51 penetrates through the first through hole 21 to operate the chip 330.

The numbers and the positions of the first positioning posts 521 and the second positioning posts 522 correspond to the numbers and the positions of the first holes 221 and the second holes 222, respectively. The number of the first holes 221 is three, the number of the second holes 222 is three, the number of the first positioning posts 521 is three, and the number of the second positioning posts 522 is three.

The chip device 50 can position the consumable container 30 by the second through holes 22 so as to prevent the unfixed position of the consumable container 30 in the outer packaging portion 20 from resulting inaccurate operation to the chip.

The numbers and the positions of the first holes 221 corresponds to the numbers and the positions of the second holes 222, respectively, and the numbers and the positions of the first positioning posts 521 and the second positioning posts 522 corresponds to the numbers and the positions of the first holes 221 and the second holes 222, respectively. As a result, the first positioning posts 521 and the second positioning posts 522 can stably fix the consumable container 30 during positioning, so as to prevent the non-corresponding position from resulting deviation and skew of the consumable container 30.

Furthermore, two contacting components (the positioning posts 52 of the chip device 50 and the consumable container 30 herein) may directly contact, or may indirectly contact by a third component between them. For example, four consumable containers 30 are wrapped by plastic film and then put into the outer packaging portion 20. When the chip device 50 is required to operate the chip 330, the positioning posts 52 of the chip device 50 directly abut against the plastic film which wraps the consumable containers 30 through the second through holes 22, and further position the consumable containers 30. In addition, four consumable containers 30 can be put into the plastic bags so that the third side surface 30*c* and the fourth side surface 30*d* are both covered by the plastic bag. The combination of the plastic bag and the consumable containers are put into the outer packaging portion 20 together. When the chip device 50 is required to operate the chip 330, the positioning posts 52 of the chip device 50 directly abut against the plastic bag through the second through holes 22, and further position the consumable containers 30. Moreover, the plastic bag has an opening position corresponding to the chip 330 so that the electrical connection of the chip 330 to the operation head 51 is ensured. Moreover, the consumable containers 30 may be wrapped or covered by other wrapper materials and then put into the outer packaging portion 20.

The outer packaging portion 20 is made of materials of copper plate cardboard, white cardboard or white board paper, or the like. Furthermore, the outer packaging portion 20 can be folded by a piece of cardboard having a plate shape.

Furthermore, the first through hole 21 and the second through holes 22 may have a round, square, elliptic or irregular shape.

Second Embodiment

Figure 6:
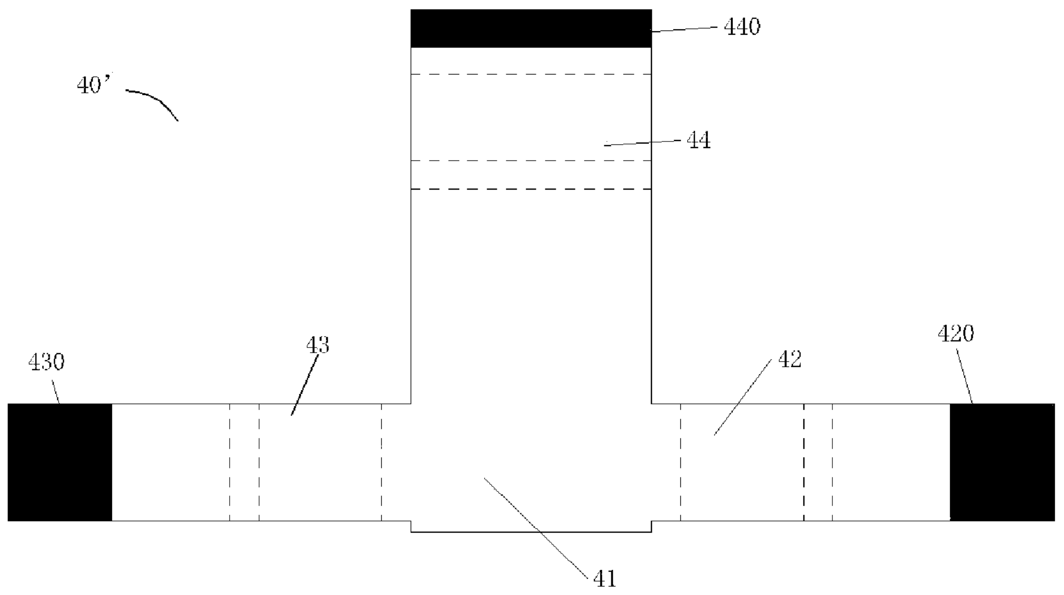
FIG. 6 is a schematic diagram of a holding member cardboard of a second embodiment of the present disclosure.
Figure 7:
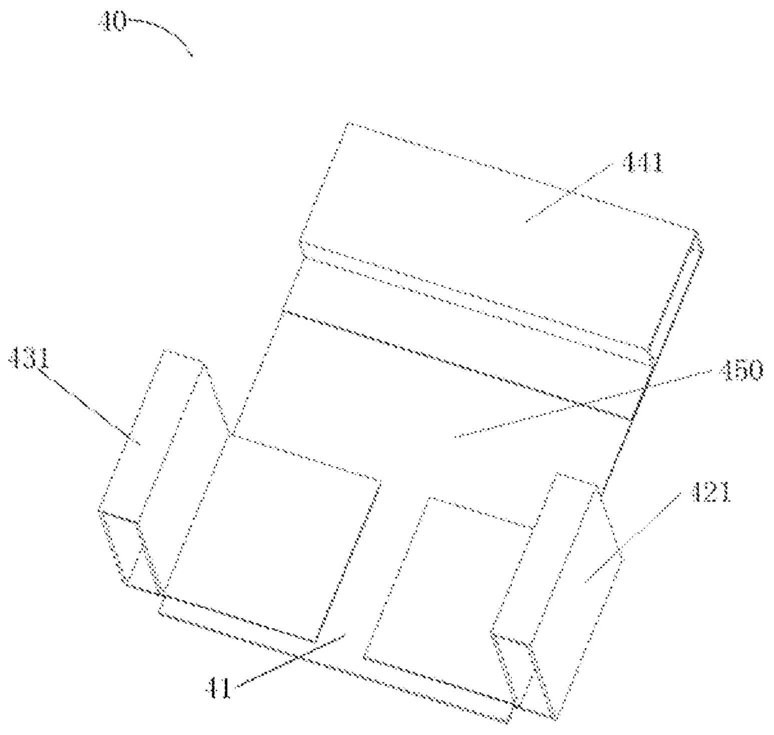
FIG. 7 is a schematic diagram of a holding member of the second embodiment.
Figure 8:
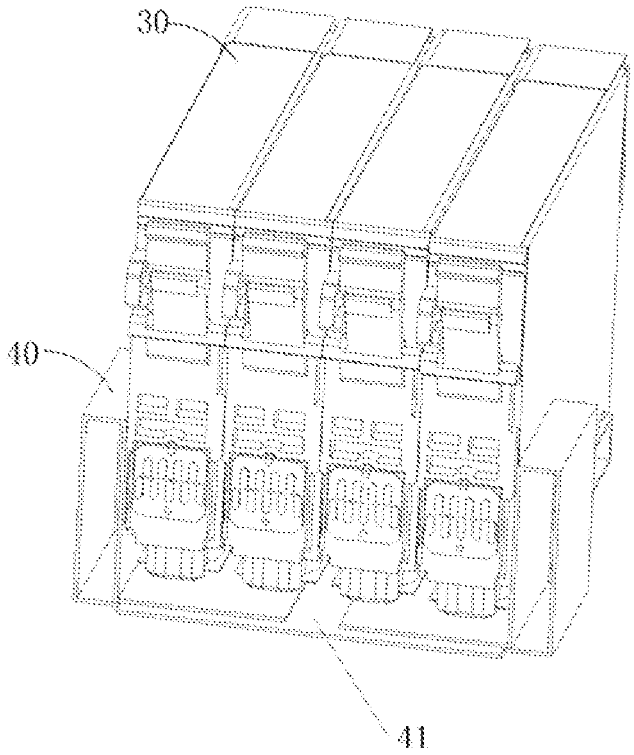
FIG. 8 is a schematic diagram of a holding member and a consumable container of the second embodiment.

FIGS. 6-8 are schematic diagram corresponding to the second embodiment. FIG. 6 is a schematic diagram of the holding member cardboard of the second embodiment. FIG. 7 is a schematic diagram of the holding member of the second embodiment. FIG. 8 is a schematic diagram of the holding member and the consumable container of the second embodiment.

The holding member 40 is formed by folding the holding member cardboard 40'. The holding member cardboard 40' has a body 41, a first wing 42, a second wing 43, and a third wing 44. The first wing 42 has a first gluing position 420, the second wing 43 has a second gluing position 430 and the third wing 44 has a third gluing position 440. The first gluing position 420, the second gluing position 430 and the third gluing position 440 may be coated by glue or covered by double sided tape, and then be folded along the dashed lines in FIG. 6. The first gluing position 420, the second gluing position 430 and the third gluing position 440 will be fixed onto the body 41. After being folded, the first wing 42 will form a first fixing position 421, the second wing 43 will form a second fixing position 431 and the third wing 44 will form a third fixing position 441. The first fixing position 421, the second fixing position 431 and the third fixing position 441 protrude relative to the body 41, forming a space 450 which can accommodate at least a part of the consumable container 30. The first fixing position 421, the second fixing position 431 and the third fixing position 441 carry the consumable containers 30 and may further fix the consumable containers 30. After the consumable containers 30 being disposed on the holding member 40, the first fixing position 421, the second fixing position 431 and the third fixing position 441 will abut against the consumable containers 30 so as to fix the consumable containers 30.

In the present embodiment, a plurality of consumable containers 30 are fixedly disposed on the holding member 40. During the manufacturing process, the holding member 40 is configured to carry and transport a plurality of semi-finished products or finished products of the consumable containers 30, that is, the holding member 40 is stored, transferred and transported together with the consumable containers 30, thereby improving the manufacturing efficiency, making it easier to dispose the plurality of consumable containers 30 in a specified manner, improving the convenience during the manufacturing process, facilitating automatic manufacturing and, at the same time, preventing the chip 330 from being stained due to the fact that the consumable containers 30 cannot be disposed uniformly in a specified pose during the manufacturing process. The procedures of removing or assembling the consumable containers 30 from or onto the chip device back and forth are optimized and the manufacturing efficiency is improved.

Furthermore, the entire set of the consumable containers 30 is fixedly assembled onto the holding member 40 during the manufacturing process, and the entire set of the consumable containers is repaired, modified and detected at the same time during repairing, modifying and detecting, thereby saving time and improving efficiency.

The holding member 40 is made of materials of copper plate cardboard, white cardboard or white board paper, or the like. In addition, the holding member 40 may be injection molded or blowing molded by materials of rubber, PP, PS, ABS, or the like. The holding member 40 may be further made of materials of metal or the like by punching, die-casting or other techniques. The holding member 40 can be further made of materials of rubber or the like, in this case the consumable containers 30 are interference fitted with the holding member 40, buffering the consumable package assembly 100 during the processes of transporting and storage.

The consumable containers 30 is assembled on the holding member 40 and then put into the outer packaging portion 20, thereby forming the consumable package assembly.

Furthermore, the holding member 40 will not shield the chip 330. After being put into the outer packaging portion 20, at least part of the chip 330 will be exposed, realizing the beneficial effects described in the first embodiment as well.

For rest of the details, please refer to the first embodiment.

Third Embodiment

Figure 9:
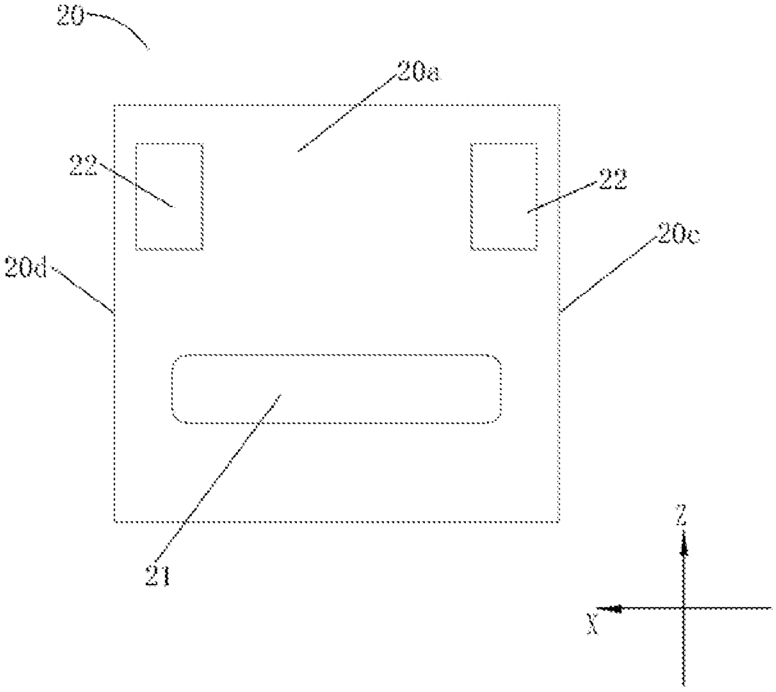
FIG. 9 is a schematic diagram of an outer packaging portion of a third embodiment of the present disclosure.
Figure 10:
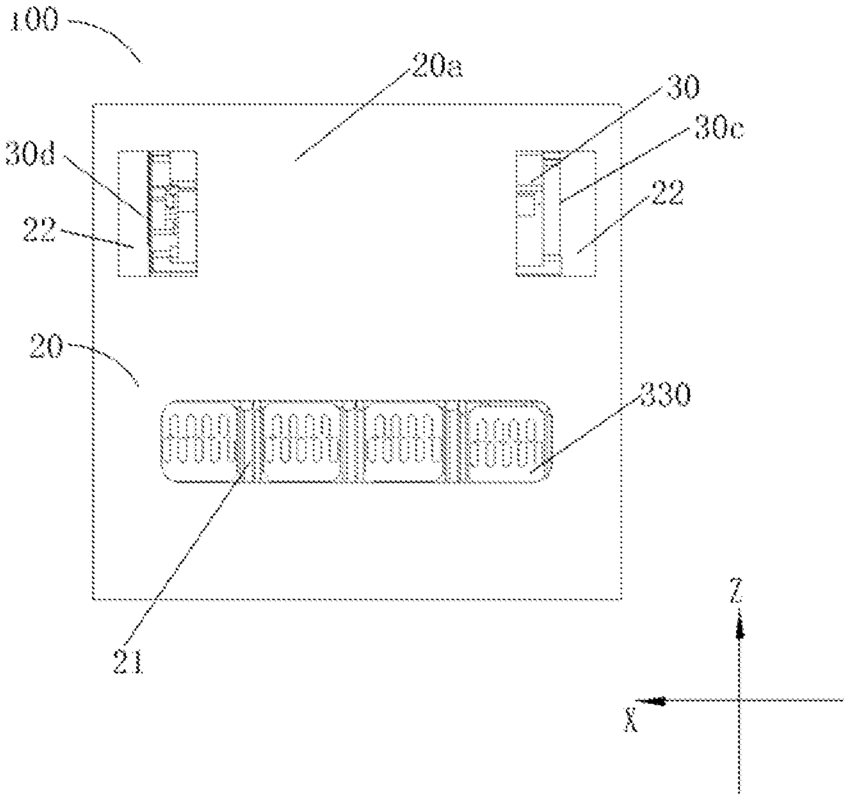
FIG. 10 is a schematic diagram of a consumable package assembly of the third embodiment.

FIG. 9 is a schematic diagram of the outer packaging portion 20 of the third embodiment. FIG. 10 is a schematic diagram of the consumable package assembly of the third embodiment.

The second through holes 22 can be provided on at least one of the first and the second surfaces 20*a*, 20*b*. In this embodiment, the second through holes 22 are provided on both the first and the second surfaces 20*a*, 20*b*. The consumable container 30 is put in the outer packaging portion 20, forming the consumable package assembly 100. As shown in FIG. 9 and FIG. 10, the second through holes 22 are formed on the first surface 20*a* and distributed at the position near the third and the fourth surfaces 20*c*, 20*d* on the first surface 20*a*. When the chip device 50 is required to operate the chip 330, the positioning portion of the chip device 50 clamp the third and the fourth sides 30*c*, 30*d* of the consumable containers 30 through the second through holes 22 to fix the consumable containers 30. Furthermore, at least part of the third and the fourth sides 30*c*, 30*d* of the consumable containers 30 will be exposed for an operator to identify the positions of the third and the fourth sides 30*c*, 30*d* accurately.

In addition, the second through holes 22 are provided on at least one of the first and the second surfaces 20*a*, 20*b* and at least one of the third and the fourth surfaces 20*c*, 20*d*.

The second through holes 22 may be further provided on the fifth and the sixth surfaces 20*e*, 20*f*. When the chip device 50 is required to operate the chip 330, the positioning portion of the chip device 50 clamp the third and the fourth sides 30*c*, 30*d* of the consumable containers 30 through the second through holes 22 to fix the consumable containers 30.

Furthermore, the second through holes 22 may be further provided on at least one of the third and the fourth surfaces 20*c*, 20*d* and at least one of the fifth and the sixth surfaces 20*e*, 20*f*.

For rest of the details, please refer to the first embodiment.

Fourth Embodiment

Figure 11:
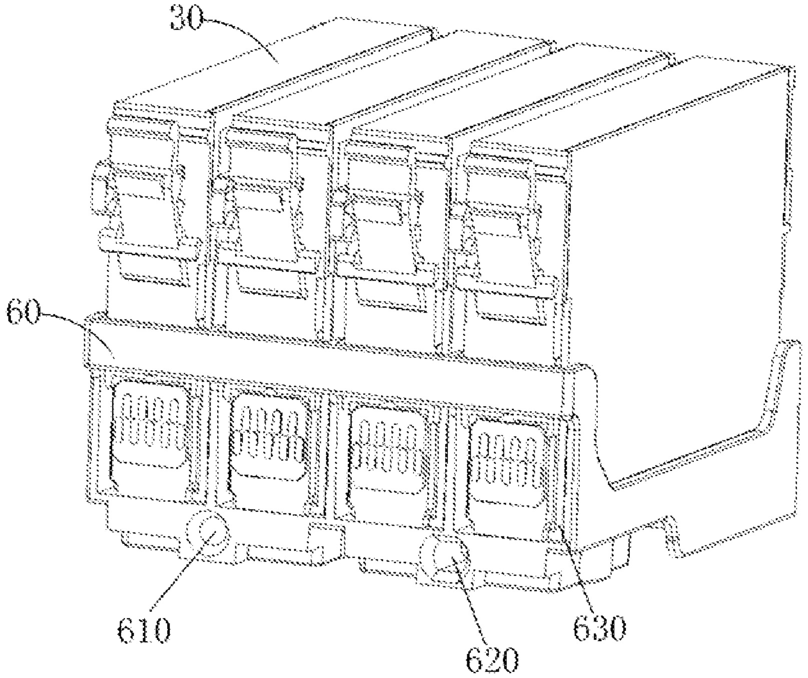
FIG. 11 is a schematic diagram of a consumable container and a holding member of a fourth embodiment of the present disclosure.
Figure 12:
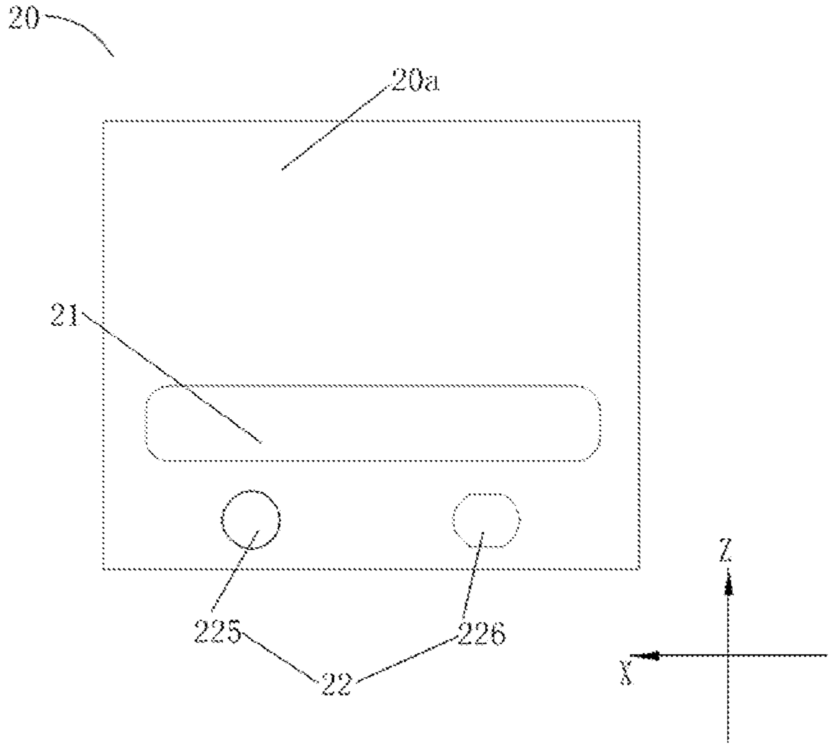
FIG. 12 is a schematic diagram of an outer packaging portion of the fourth embodiment.
Figure 13:
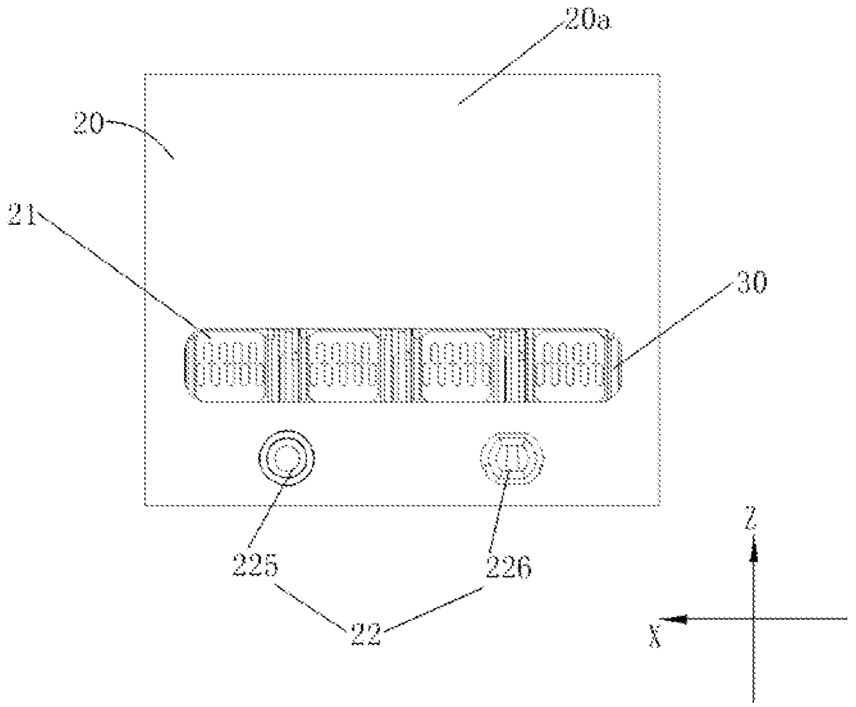
FIG. 13 is a schematic diagram of a consumable package assembly of the fourth embodiment.

FIG. 11 is a schematic diagram of the consumable container and the holding member of the fourth embodiment. FIG. 12 is a schematic diagram of the outer packaging portion of the fourth embodiment. FIG. 13 is a schematic diagram of the consumable package assembly of the fourth embodiment.

The consumable package assembly 100 further includes a holding member 60. The holding member 60 loads the consumable container 30 during the manufacturing process. The holding member 60 is injection molded by materials of PP, PS, ABS or the like. The holding member 60 has a positioning frame, a window 630, a first positioning hole 610 and a second positioning hole 620. The positioning frame can position the consumable containers 30. The window 630 can expose, instead of covering, the chip 330. The first and the second positioning holes 610, 620 are engaged with the positioning posts 52 of the chip device 50, and the second through holes 22 exposes part of the holding member 60 so as to position the assembly of the consumable containers 30 and the holding member 60. The positioning posts 52 of the chip device 50 will be inserted into the first and the second positioning holes 610, 620 to position the holding member 60 and the consumable containers 30. Furthermore, the holding member 60 also has partitioning walls which fix the consumable containers 30, respectively. The positions of the second through holes 22 corresponds to the positions of the positioning holes on the holding member 60.

The second through holes 22 includes two holes provided on a same surface of the outer packaging portion 20, which are a first sub-hole 225 and a second sub-hole 226, respectively. The first sub-hole 225 is a round hole and the second sub-hole 226 is a elliptic hole. The first positioning hole 610 is a round hole and a second positioning hole 620 is a elliptic hole. The first sub-hole 225 as a round hole, the second sub-hole 226 as a elliptic hole. The first positioning hole 610 as a round hole and the second positioning hole 620 as a elliptic hole. Such an arrangement can provide a certain adjustment space when the positioning posts 52 are inserted into the second through holes 22. If the first and the second sub-holes are both round holes, interference may occur when inserting the positioning posts 52 into the second through holes 22 as well as the first and the second positioning holes 610, 620, resulting in that the positioning posts 52 cannot be inserted into the first and the second positioning holes 610, 620 smoothly.

By positioning the holding member 60, indentation and stain caused by the manufacturing devices squeezing and clamping the consumable containers 30 can be avoided during the manufacturing process.

Furthermore, the second through holes 22 includes a plurality of holes, at least one of which is a elliptic hole. The number and the position of the second through holes 22 corresponds to the positioning holes on the holding member 60, thereby providing a certain adjustment space when the positioning posts 52 are inserted into the second through holes 22.

In another aspect, if there is no positioning hole on the holding member 60, the position of the second through holes 22 corresponds to the wall of the holding member 60. When the chip device 50 is required to operate the chip 330, the positioning portion (which may be the positioning posts 52) of the chip device 50 position (may clamp or squeeze by two sides) the holding member 60 through the second through holes 22. Furthermore, the positioning portion of the chip device 50 can be positioned with the positioning holes on the holding member 60 and the wall of the holding member 60 together. By positioning the holding member 60, indentation and stain caused by the manufacturing devices squeezing and clamping the consumable containers 30 can be avoided during the manufacturing process.

For rest of the details, please refer to the first embodiment.

In addition, at least two surfaces of the outer side of the outer packaging portion 20 can be covered by packaging film.

A buffer member 23 is provided around an vulnerable part of the consumable container 30 in order to avoid damage to the vulnerable part. As shown in FIG. 1, the vulnerable part of the consumable container 30 is the fixing portion 320, which is an movable element and tends to be damaged due to collision from the outside. A buffer member 23 provided around the fixing portion 320 is configured to prevent the fixing portion 320 from being damaged.

Fifth Embodiment

On the basis of the first to the fourth embodiments, the consumable package assembly 100 in each embodiment may further include a protection component 70. The provided protection component 70 may be provided on the outer packaging portion 20. The protection component 70 covers at least part of the first through hole 21 or the second through holes 22 for blocking the communication between the accommodating portion and the outside. Furthermore, the protection component 70 covers the first through hole 21 or at least part of the second through holes 22, and completely blocks the communication between the accommodating portion and the outside.

Figure 14:
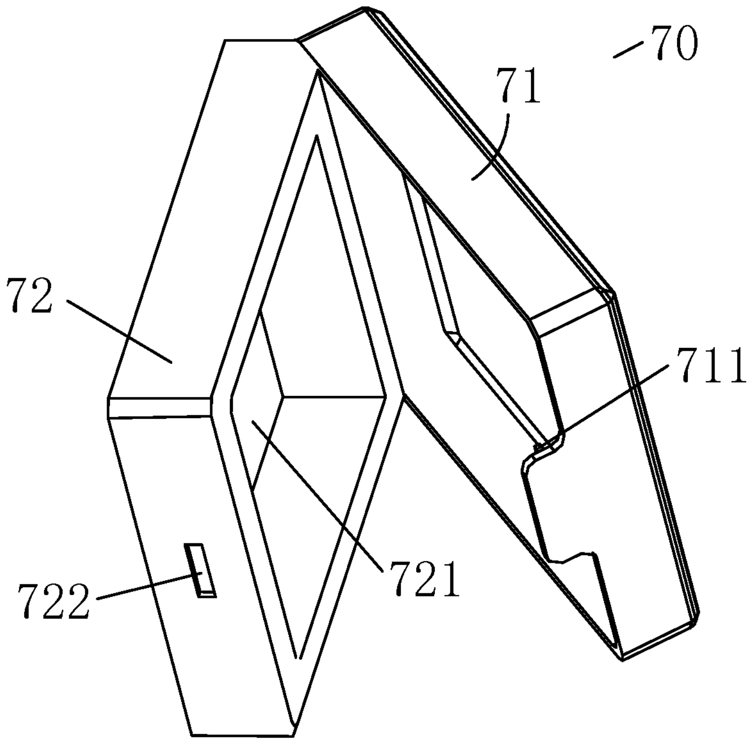
FIG. 14 is a schematic diagram of a protection component of a fifth embodiment of the present disclosure.

In an embodiment, for the provided protection component 70, in order to block the communication between the inside and the outside, the provided protection component 70 may be a protective film structure, which can be detachably connected to the outer packaging portion 20 and/or the consumable container 30. The protective film can be waterproof, dustproof and air-circulation-proof, so as to seal the corresponding first through holes 21 or the second through holes 22. In order to ensure the sealing effect of the protective film, and to facilitate the user's operation and facilitate the opening and sealing of the corresponding opening, the protective film can be connected by glue. The glued material can be disposable or recyclable. The protection component 70 can shield or open the first through hole 21 or the second through holes 22. When the chip needs to be reset or rewritten, the protective film is torn off, and then the chip is operated through the first through hole 21 or the second through holes 22. After completing the operation, the first through hole 21 or the second through holes 22 are covered by adhesive materials. The protection component may be self-adhesive paper, adhesive-type plastic film, or the like. FIG. 14 is a schematic diagram of the protection component of the fifth embodiment.

A printing device includes a consumer package assembly 100 and a protection component 70. The consumer package assembly 100 includes an outer packaging portion 20. The outer packaging portion 20 is provided with a first through hole 21 for exposing at least part of the chip 330 contained in the outer packaging portion 20. The second through hole 22 is configured to expose at least part of the consumable container 30/the holding member 60. The protection component 70 is assembled on the outer packaging portion 20. The protection component 70 can shield the first through hole 21 or the second through holes 22 to shield the exposed part of the chip 330, or the protection component 70 can open the first through hole 21 to connect the chip 330 to the chip device 50.

In the embodiments of the present disclosure, at least part of the chip 330 is exposed to the outer packaging portion 20 through the first through hole 21, so that the user can operate the chip 330 to reset, rewrite or detect the information stored in the chip 330. However, since the exposed part of the chip 330 is always in contact with the external soldering environment through the first through hole 21, dust will enter the chip 330, thereby adversely affecting the service life of the chip 330. In order to solve the above mentioned technical problems, in this embodiment, a protection component 70 is assembled at the first through hole 21. When it is not required to operate the chip 330, the first through hole 21 is shielded by the protection component 70 to shield the exposed the part of the chip 330 along the first through hole 21, so as to reduce the risk of dust entering the chip 330. The protection component 70 protects the chip 330 to increase the service life of the chip 330, thereby increasing the service life of the printing device, reducing maintenance and replacement of the printing device, and saving cost.

Moreover, when it is required to operate the chip 330, the protection component 70 can open the first through hole 21 to operate the chip 330.

In an embodiment, the protection component 70 includes an upper cover 71 which is connected to the outer packaging portion 20 and can move relative to the outer packaging portion 20. During the movement of the upper cover 71, the first through hole 21 can be blocked or opened. In the embodiments of the present disclosure, when the upper cover 71 blocks the first through hole 21, the exposed part of the chip 330 is shielded. By using the cover structure to cover the first through hole 21, the protection of the chip 330 can be improved and the risk of damaging the chip 330 can be reduced due to accidental touch by external components. The upper cover 71 and the outer packaging portion 20 can be rotatably connected. When the upper cover 71 rotates relative to the outer packaging portion 20, the first through hole 21 can be blocked or opened.

Furthermore, the protection component 70 further includes a lower cover 72, which is connected to the outer packaging portion 20 and covers the first through hole 21. The lower cover 72 is provided with a third through hole 721 which is connected to the first through hole 21. The upper cover 71 can move relative to the lower cover 72 to block or open the third through hole 721. In the embodiments of the present disclosure, when the upper cover 71 opens the third through hole 721, at least part of the chip 330 can be exposed along the first through hole 21 and the third through hole 721 so as to operate the chip 330. The upper cover 71 can be fastened to the lower cover 72 to block the third through hole 721 and further the first through hole 21 to cover the exposed part of the chip 330 so as to improve the sealing performance of shielding the exposed part of the chip 330.

Wherein the upper cover 71 and the lower cover 72 may be rotatably connected. When it is required to operate the chip 330, the upper cover 71 is rotated to open the third through hole 721, and when it is not required to operate the chip 330, the upper cover 71 is reversely rotated to block the third through hole 721. Alternatively, the upper cover 71 and the lower cover 72 can also be detachable connected, that is, when it is not required to operate the chip 330, the upper cover 71 is fastened on the lower cover 72 to block the third through hole 721. When it is required to operate the chip 330, the upper cover 71 is detached from the lower cover 72 to open the third through hole 721.

In an embodiment, one of the upper cover 71 and the lower cover 72 is provided with a first clamping portion 711 and the other one is provided with a first engagement portion 722. The first clamping portion 711 can be clamped to or unlocked from the first engagement portion 722. When the first clamping portion 711 is clamped to the first engagement portion 722, the upper cover 71 blocks the third through hole 721. In the embodiments of the present disclosure, when the upper cover 71 is fastened to the lower cover 72, the first clamping portion 711 can be clamped with the first engagement portion 722 to lock the upper cover 71 and the lower cover 72, improving the reliability of the connection between the upper cover 71 and the lower cover 72, reducing the risk of accidental opening of the upper cover 71. When the upper cover 71 is opened, the clamping portion can be unlocked from the first engagement portion 722 to unlock the upper cover 71 from the lower cover 72. The first clamping portion 711 is a convex portion, and the first engagement portion 722 is a concave portion.

For rest of the details, please refer to the first embodiment.

Sixth Embodiment

Figure 15:
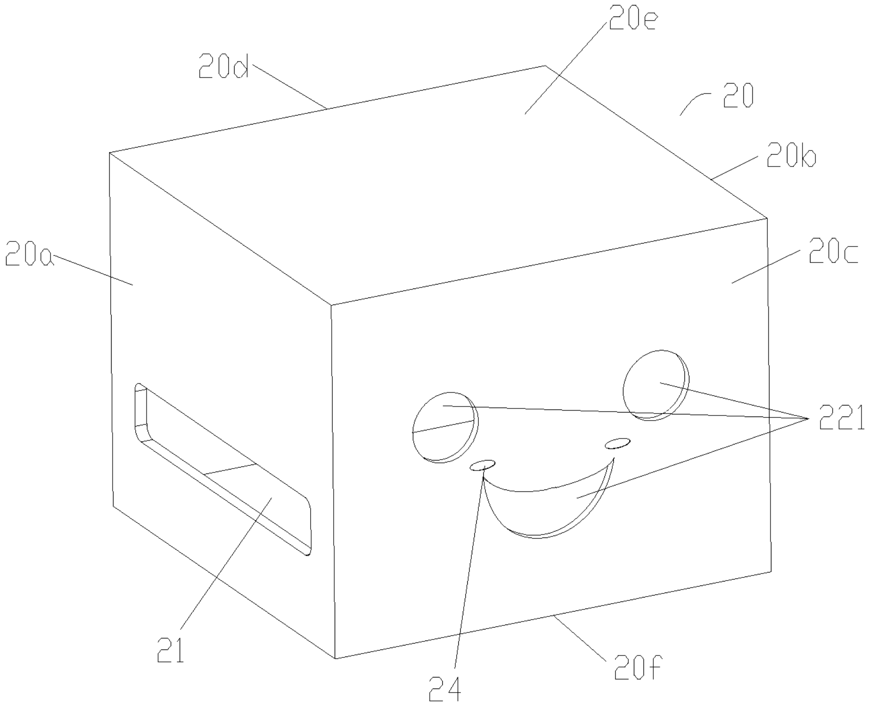
FIG. 15 is a schematic diagram of an outer packaging portion of a sixth embodiment of the present disclosure.

FIG. 15 is a schematic diagram of the outer packaging portion 20 of the sixth embodiment.

In the embodiments of the present disclosure, a plurality of second through holes 22 on the third surface 20*c* or the fourth surface 20*d* of the outer packaging portion 20 may be provided, and the plurality of second through holes 22 on a same surface can be joined together to form a special shape, such as, a shape of a smiley face. The eyes and mouth of the smiley face are the second through holes 22, thereby making the outer packaging portion cute and improving the frequency of use of the outer packaging portion.

In the same way, the first through hole 21 can also be designed in some special shapes.

Furthermore, the outer packaging portion 20 further includes a decorative portion 24, which is provided on the first, the second, the third, or the fourth surface 20*a*, 20*b*, 20*c*, 20*d*, making the image of the outer packaging portion 20 more vivid.

The second through holes 22 may also be uniformly distributed on the third surface 20*c* or/and the fourth surface 20*d*, or unevenly distributed on the third surface 20*c* or/and the fourth surface 20*d*.

The foregoing descriptions are only preferred embodiments of the present disclosure, and are not intended to limit the present disclosure. For those skilled in the art, the present disclosure can have various modifications and changes. Any modification, equivalent replacement, improvement, and the like made within the spirit and principle of this disclosure shall be included in the protection scope of the present disclosure.

The invention claimed is:

1. A consumable package assembly, comprising a consumable container and an outer packaging portion, wherein the consumable container comprises a chip, and the outer packaging portion comprises an accommodating portion for accommodating the consumable container, the outer packaging portion comprises a first through hole configured to expose at least a part of the chip, and a second through hole configured to expose at least part of the accommodating portion, so as to position the consumable container; and the second through hole is configured such that at least a part of a chip device for operating the chip is capable of being inserted into the accommodating portion to position the consumable container.

2. The consumable package assembly according to claim 1, wherein the outer packaging portion comprises a first surface and a second surface opposite to the first surface along a width direction of the consumable package assembly; and the chip is provided corresponding to the first surface and is parallel to the first surface, and the chip is arranged closer to the first surface than to the second surface, and the first through hole is provided in the first surface.

3. The consumable package assembly according to claim 2, wherein at least one of the first surface and the second surface is provided with the second through hole along the width direction of the consumable package assembly.

4. The consumable package assembly according to claim 2, wherein the outer packaging portion further comprises a third surface and a fourth surface opposite to the third surface along a length direction of the consumable package assembly; and at least one of the third surface and the fourth surface is provided with the second through hole.

5. The consumable package assembly according to claim 2, wherein the outer packaging portion further comprises a third surface and a fourth surface opposite to the third surface along a length direction of the consumable package assembly; and at least one of the first surface and the second surface is provided with the second through hole, and at least one of the third surface and the fourth surface is provided with the second through hole.

6. The consumable package assembly according to claim 2, wherein the outer packaging portion comprises a plurality of second through holes.

7. The consumable package assembly according to claim 2, wherein the consumable package assembly further comprises a holding member provided at the accommodating portion and configured to load the consumable container.

8. The consumable package assembly according to claim 2, wherein the consumable package assembly further comprises:

a protection component covering at least a part of the first through hole, and configured to block communication between the accommodating portion and the outside;

wherein the protection component is capable of shielding or opening the first through hole.

9. The consumable package assembly according to claim 1, wherein the outer packaging portion comprises a plurality of second through holes.

10. The consumable package assembly according to claim 1, wherein the consumable package assembly further comprises a holding member provided at the accommodating portion and configured to load the consumable container.

11. The consumable package assembly according to claim 10, wherein the second through hole exposes a part of the holding member to position an assembly of the consumable container and the holding member.

12. The consumable package assembly according to claim 10, wherein the holding member comprises a positioning hole aligned with the second through hole in a width direction or a length direction.

13. The consumable package assembly according to claim 1, wherein the consumable package assembly further comprises:

a protection component covering at least a part of the first through hole, and configured to block communication between the accommodating portion and the outside;

wherein the protection component is capable of shielding or opening the first through hole.

14. The consumable package assembly according to claim 13, wherein the protection component comprises an upper cover and a lower cover, the upper cover is rotatably connected to the lower cover, the lower cover is connected to the outer packaging portion and covers the first through hole, and the lower cover comprises a third through hole in communication with the first through hole;

the upper cover is connected to the outer packaging portion and is capable of moving relative to the outer packaging portion; and during movement of the upper cover, the upper cover is capable of shielding or opening the first through hole.

15. The consumable package assembly according to claim 14, wherein one of the upper cover and the lower cover is provided with a first clamping portion and the other one of the upper cover and the lower cover is provided with a first engagement portion, the first clamping portion is capable of being clamped to or unlocked from the first engagement portion, and when the first clamping portion is clamped to the first engagement portion, the upper cover blocks the third through hole.

16. The consumable package assembly according to claim 1, wherein the outer packaging portion comprises a plurality of second through holes.

17. The consumable package assembly according to claim 1, wherein the consumable package assembly further comprises a holding member provided at the accommodating portion and configured to load the consumable container.

18. The consumable package assembly according to claim 1, wherein the consumable package assembly further comprises:

a protection component covering at least a part of the first through hole, and configured to block communication between the accommodating portion and the outside;

wherein the protection component is capable of shielding or opening the first through hole.

* * * * *